(12) United States Patent
Ogawa et al.

(10) Patent No.: US 9,555,463 B2
(45) Date of Patent: Jan. 31, 2017

(54) PIPING SYSTEM

(71) Applicant: Nissyo Techno Co., Ltd., Koriyama, Fukushima (JP)

(72) Inventors: Iwakichi Ogawa, Fukushima (JP); Echiro Watanabe, Fukushima (JP); Yoshio Suzuki, Fukushima (JP); Takeji Endo, Fukushima (JP)

(73) Assignee: Nissyo Techno Co., Ltd. (JP)

( * ) Notice: Subject to any disclaimer, the term of this patent is extended or adjusted under 35 U.S.C. 154(b) by 483 days.

(21) Appl. No.: 13/895,366

(22) Filed: May 16, 2013

(65) Prior Publication Data

US 2014/0259581 A1    Sep. 18, 2014

(30) Foreign Application Priority Data

Mar. 18, 2013  (JP) ................. 2013-078962

(51) Int. Cl.
| | | |
|---|---|---|
| B21D 41/00 | (2006.01) | |
| B21D 41/02 | (2006.01) | |
| B21D 19/04 | (2006.01) | |
| B21D 53/24 | (2006.01) | |
| B21H 3/04 | (2006.01) | |
| B23P 23/04 | (2006.01) | |

(52) U.S. Cl.
CPC ............ *B21D 41/00* (2013.01); *B21D 19/046* (2013.01); *B21D 41/02* (2013.01); *B21D 41/021* (2013.01); *B21D 53/24* (2013.01); *B21H 3/04* (2013.01); *B23P 23/04* (2013.01); *Y10T 29/5176* (2015.01)

(58) Field of Classification Search
CPC ..... B21D 19/04; B21D 19/043; B21D 19/046; B21D 19/02; B21D 19/00; B21D 41/02; B21D 41/021; B21D 41/023; B21D 53/24; B21H 3/04; B21H 3/042
See application file for complete search history.

(56) References Cited

U.S. PATENT DOCUMENTS

| | | | | |
|---|---|---|---|---|
| 4,689,984 A | * | 9/1987 | Kellner ................. | B21J 13/025 470/68 |
| 7,257,975 B1 | * | 8/2007 | Stauffacher .......... | B21D 19/046 72/117 |
| 2006/0162410 A1 | * | 7/2006 | Ogawa ................. | B21D 19/046 72/117 |

FOREIGN PATENT DOCUMENTS

| | | | |
|---|---|---|---|
| JP | H10-146623 A | | 6/1998 |
| JP | 2002035849 A | * | 2/2002 |
| JP | 3504653 B | | 3/2004 |

\* cited by examiner

*Primary Examiner* — Debra Sullivan
(74) *Attorney, Agent, or Firm* — Lerner, David, Littenberg, Krumholz & Mentlik, LLP (57) ABSTRACT

A piping system includes a flare machining mechanism and a screw machining mechanism that machines the ends of pipes by cold-pressed formation. The flare machining mechanism flares the ends of pipes outward and the screw machining mechanism machines the outside of the pipe end into a convex screw and the inside of the pipe end into a concave screw are provided on the same rotor mechanism and the same chuck. The piping system is configured to execute flare machining and screw machining of the end of the pipe by exchanging the flare machining head and the screw machining head.

18 Claims, 9 Drawing Sheets

PIPING SYSTEM

CROSS-REFERENCE TO RELATED APPLICATION

This application is based on and claims priority pursuant to 35 U.S.C. §119 to Japanese Patent Application No. 2013-78962, filed on Mar. 18, 2013 in the Japan Patent Office, the entire disclosure of which is hereby incorporated by reference herein.

BACKGROUND

Technical Field

The present invention relates to a piping system, and more particularly to a piping system that provides on the same assembly a flare machining mechanism that expands and flares outward pipe ends and a screw machining mechanism that causes cold-pressed transformation of the inner and outer circumferential ends of pipes, with the flare machining head and the screw machining head disposed on the same chuck to enable flare machining and screw machining by changing the machining heads or shifting their positions.

Background Art

Conventionally, pipes are joined together by a variety of methods and widely used as foundation piles for buildings as well as piping to transport fluids and air.

Of the pipes used as foundation piles for buildings, large-diameter pipes are sunk into holes dug in the ground and concrete is poured into them whereas small-diameter pipes are driven straight into the ground with a pile driver or the like.

The small-diameter foundation piles are sunk by rotating the pipes without removing earth. However, depending on the soil there is a limit to how far they can be sunk into the ground, and so they are processed by cutting or joining the ends.

Long pipes are cut into small lengths and brought to the construction site and joined together and buried in the ground as described below, although these methods of joining have until now been complicated and labor-intensive.

For example, the end of a pipe sunk into the ground is left exposed at the surface and a new pipe is connected to that portion by welding, fixed in place, and sunk further into the ground. Alternatively, a cylindrical spacer is inserted to and made to project from the top end of the foundation pile and welded thereto, after which the pipe is sunk into the ground with this portion exposed at the surface, and a further connecting pipe is inserted at the correct position using this projecting spacer as a guide, and the pipes are fixed in place by welding and then sunk into the ground. Yet alternatively, one end of the spacer is sealed, multiple projections are mounted thereon, and a spacer with multiple holes therein sealing an end that fits this end is inserted into the pipe ends and forcibly joined together using a hydraulic cylinder. Yet further alternatively, pipes are joined together by a spacer and the two pipe ends are fixed in place with a transverse pin or the like without welding.

For piping used to transport fluids or air, in a case in which the pipes are cut to a predetermined length and joined to form a predetermined piping path, the methods used to join the pipes together include: welding the outer circumferences of the joints of the pipes; welding flanges to the ends of the pipes and fastening the flanges together with nuts and bolts; joining using a sleeve-type coupling in which female screw threads are cut into the inner surface thereof; and further, flaring and machining the ends of each pipe and fixing and joining free flanges using nuts and bolts.

Pipes that become foundation piles for buildings are sunk into the ground and used for earthquake proofing, earthquake protection, and earthquake resistance. However, the depth to which the foundation piles are sunk differs depends on the condition of the ground. For this reason, when constructing buildings in densely populated residential areas, the foundation piles are cut to transportable lengths and then joined in arbitrary lengths and sunk into the ground.

In this case, the pipes are electrically welded, which means that work cannot be carried out at the construction site when it is raining.

The pipes are sometimes joined together using a specialized member such as a spacer that does not require welding bores of the pipes. However, such operations are time-consuming in that the locations where the pins or other members are to be inserted into the pipes when joining must be aligned, or a thick, expensive spacer member must be used to maintain the same strength at the pipe and the member.

Joining foundation piles by fitting a spacer with multiple projections with a spacer with multiple holes that fits this spacer and which do not require welding, in which the ends of the pipes are slightly enlarged, involves a complicated process of setting a plurality of small-scale hydraulic cylinders at the joints, and moreover the pipes to be joined must be kept perfectly vertically.

In addition, pipes are often laid in high places, requiring that welding of joints be done on scaffolding. In order to weld the entire circumference of the end of the pipe it is often necessary to assume uncomfortable positions, leading to uneven or misaligned welds and emitting sparks and sludge that pose hazards to health and surroundings.

Moreover, when pipes are changed or rearranged, it is necessary to cut the pipes and then weld them together again, which are not easy operations.

Flanged pipes can be fixed in place using nuts and bolts, and for this reason can be handled in high places comparatively easily. But it is necessary to weld the flanges to the pipes in the first place, and if this work is not done accurately fluid or gas leaks might occur once the pipes are mounted in place, or the pipes cannot be laid along a predetermined path.

It is possible to use loose flanges that are not welded to the pipes but which can be slid outward along the outer circumference of the pipe and, after the flange is fitted to the pipe, the ends of the pipe are bent outward in a flaring process. At the construction site, packing is inserted between the flared portions that are to be joined together and the flared portions are sandwiched by the loose flanges and fixed in place with nuts and bolts. This method is adopted as one capable of executing piping work with only machining and does not require welding, and can utilize the piping system of the present invention.

There is a specialized flaring machine consisting of conical machining heads of a single type that are disposed horizontal to the mouth of the pipe. The base on which the conical machining heads are disposed is spun around axles on both sides and slid along the inner circumference of the pipe until the conical machining heads are vertical to the mouth of the pipe about the axial center.

Further, there is a specialized flaring machine that is equipped with a first machining roller that flares the end of the pipe by spreading the end of the pipe to an intermediate point and a second machining roller that causes cold-pressed deformation up to a predetermined spread point.

However, although at present there are several types of flaring machines that can handle pipes from size 40 A to 500 A, these are all machines that can accommodate only a certain range of pipe sizes and are dedicated for flaring fabrication, and thus are not all-purpose machines.

In addition, there are small, specialized cold-pressed forging screw machining machines that only form the outer circumferential surface of the pipe into a projecting screw. However, to join these types of pipes together it is necessary to use a special-purpose socket and a large step is formed at the joint. For these reasons, such machines are unsuitable for machining foundation piles and are not generally used.

In addition, although there are small, specialized cold-pressed forging screw machining machines that machine the outer circumferential surfaces of pipes into male screw threads, because joining requires using a special socket above-described a large step is created at the joint, such machines are unsuitable for machining foundation piles and are not generally used.

Further, although there are cases in which the inside of the pipe is machined into concave screw threads while the outside is processed into convex screw threads, such machining shaves the ends of the pipe and thus weakens them compared to the rest of the pipe.

Moreover, because the shape of the shaved thread is an angle or even an acute angle the fitting is not easy in the event that earth and sand get into the threads. Furthermore, the shaving removes the plating and rust appears quickly, making these pipes unsuitable for use as foundation piles.

As described above, whether for building foundation piles that are sunk into the ground or for transporting fluids or air, there is a limit to how long the pipes can be at the construction site, and therefore the pipes must be cut and joined as necessary. Cutting long pipes into small sections, transporting them to the construction site, and then connecting them at the construction site is extremely laborious and time-consuming

SUMMARY

The present invention provides a piping system which has a box frame comprising a base frame, an upper frame, a front frame, a back frame, and side frames; a chuck mount disposed within the box frame; a rotary base mount disposed within the box frame; an arm base disposed within the box frame; a rotor mechanism disposed within the box frame; a flare machining mechanism disposed on the rotor mechanism and mounting a flare machining head that flares an end of a pipe outward; and a screw machining mechanism disposed on the rotor mechanism and mounting a screw machining head configured to cause cold-pressed deformation of the end of the pipe to machine the outer circumference of the end of the pipe into a convex screw and to machine the inner circumference of the end of the pipe into a concave screw. The flare machining head of the flare machining mechanism and the screw machining head of the screw machining mechanism are disposed on the same chuck. The piping system is configured to execute flare machining and screw machining of the end of the pipe by exchanging the flare machining head and the screw machining head.

With the piping system described above, three types of machining—flaring, convex screw formation, and concave screw formation—can be accomplished using a single machine, simply by changing and repositioning the machining heads.

Moreover, the piping system is compact and can be easily moved to the pipe-laying construction site for use on-site in pipe-laying and building construction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

A detailed description is now given of exemplary embodiments of a piping system according to the present invention. Although for the sake of clarity specific terminology is employed to describe embodiments, the present disclosure is not limited to the specific terminology so selected. It is to be understood that each specific element includes all technical equivalents that have a similar function, operate in a similar manner, and achieve a similar result.

Figure 1:
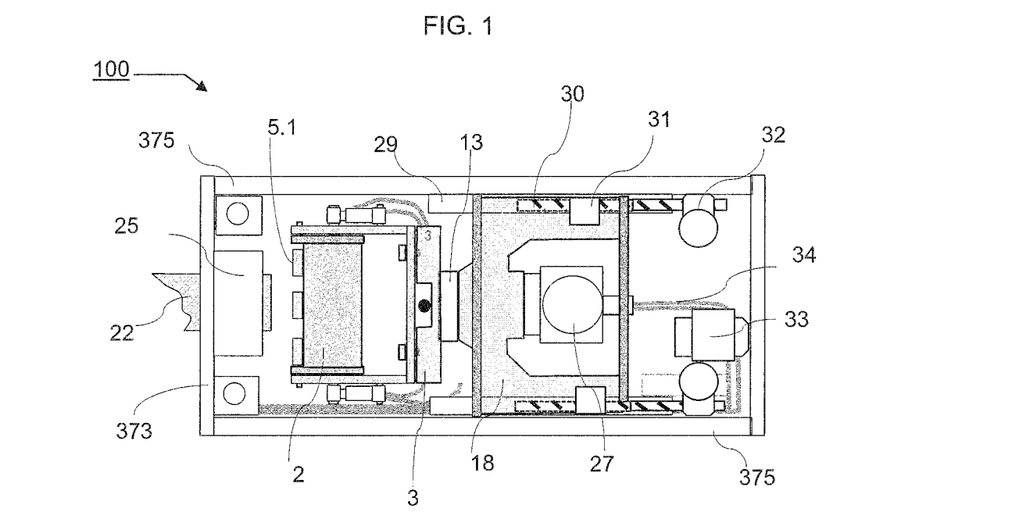
FIG. 1 is a schematic plan view of the overall structure of a piping system according to the present invention.
Figure 2:
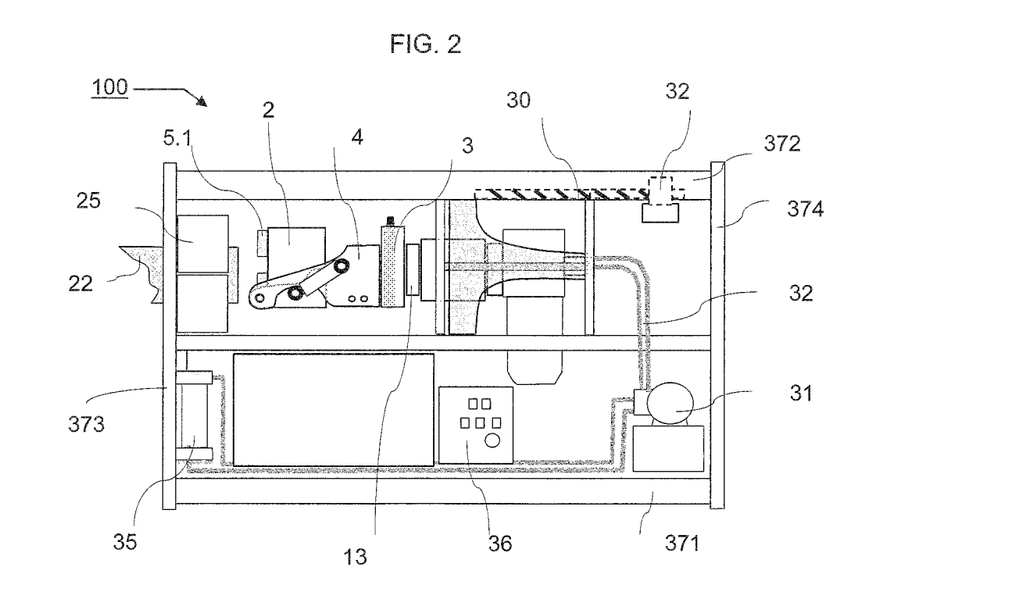
FIG. 2 is a schematic side view of the overall structure of the piping system.

FIG. 1 is a schematic plan view of the overall structure of a piping system 100 according to the present invention, and FIG. 2 is a schematic side view of the overall structure of the piping system 100 shown in FIG. 1.

A base frame 371, an upper frame 372, a front frame 373, a back frame 374 and side frames 375 together constitute a strong box frame of the piping system 100, within which are disposed a rotor mechanism 1, a chuck mount 2, a rotary base mount 3, and an arm base 4.

Three attachment sockets, 5.1, 5.2, and 5.3, are provided on the chuck mount 2 at three separate locations together with a chuck control unit 6.

The arm base 4 is mounted on the rotary base mount 3 by arm base mounting screws 7, such that the arm base 4 moves up and down (vertically) by operation of an arm base control shaft 9 controlled by an arm base control knob 8.

By adjusting to the pipe size by the vertical movement of the arm base 4, the chuck mount 2 revolves around a chuck mount support shaft so that the posture of the chuck mount 2 is adjusted to suit each type of machining, as is described later.

Guide rollers 17.1 and 17.2 are fitted onto each of the attachment sockets 5.1 and 5.2 of the chuck mount 2.

A pipe 22 is inserted into a clamp chuck 25 disposed on the inside of the front frame 373 from in front of the front frame 373, and the pipe 22 is forcibly clamped in place by the clamp chuck 25.

The pipe 22 can be forcibly clamped in place by the clamp chuck 25 by the pressing power of a hydraulic cylinder B 35 operated by the hydraulic pressure of a hydraulic pump 33, acting through a hydraulic pipe 34.

In FIGS. 1 and 2, reference numeral 13 designates a rotary packing coupler, 18 designates a tip portion of the screw machining head 16, 29 designates a guide rail, 30 designates a drive shaft, 31 designates a nut liner, and 36 designates a power distribution box.

The front end of the pipe 22 supported in place in contact with the rotor mechanism 1 and, as is shown below, the front end of the pipe 22 can be flared or threaded by the basic operation of the rotor mechanism 1 and by changing the machining heads.

By attaching a flare machining head 15 to the chuck mount 2 and moving the chuck mount 2 using the arm base control knob 8 of the rotary base mount 3 to fit the size of the pipe 22, the action of the hydraulic cylinder A 10 rotates and slides the chuck mount 2 around the inside of the end of the pipe 22, enabling the flare machining mechanism of the rotor mechanism 1 to flare the end of the pipe 22.

Figure 3:
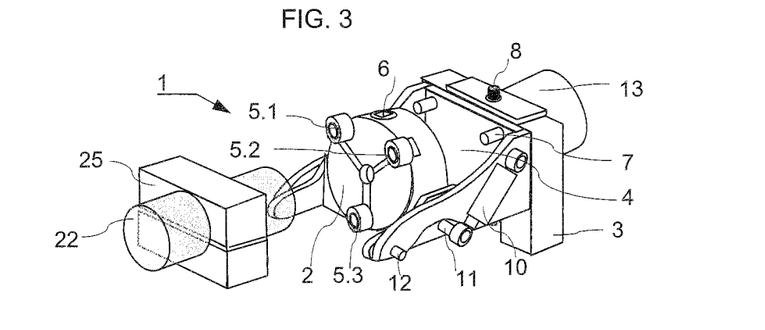
FIG. 3 is a perspective view of a mechanical portion of the piping system.
Figure 4:
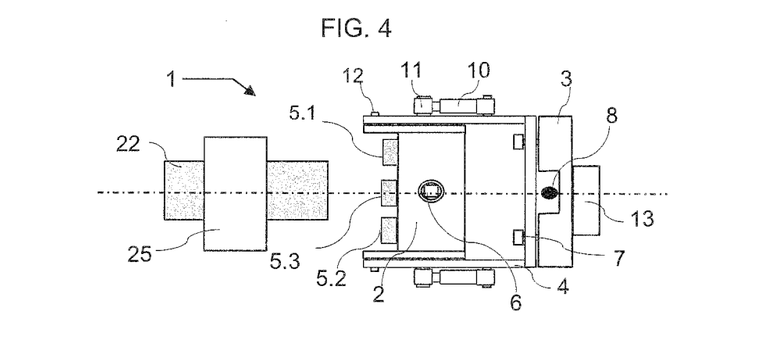
FIG. 4 is a plan view of the mechanical portion of the piping system.
Figure 5:
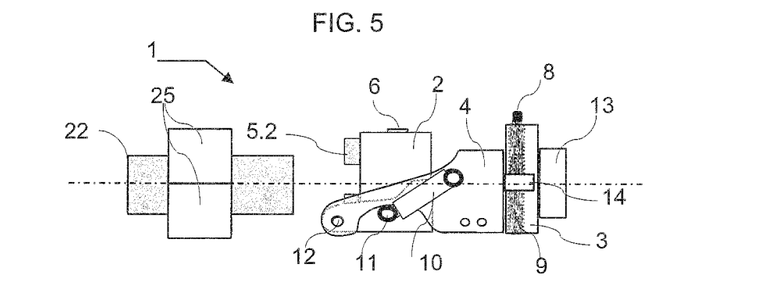
FIG. 5 is a side view of the mechanical portion of the piping system.
Figure 6:
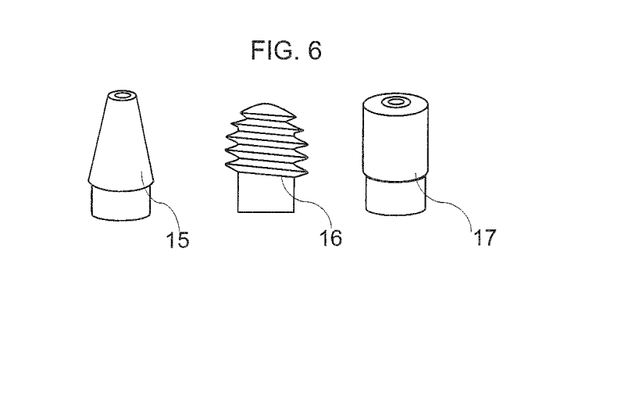
FIG. 6 shows machining heads attached to a flare machining mechanism and a screw machining mechanism.
Figure 7A:
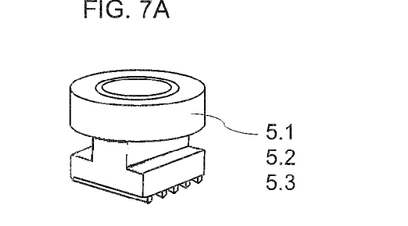
FIG. 7A shows an attachment socket that attaches to the machining head.
Figure 7B:
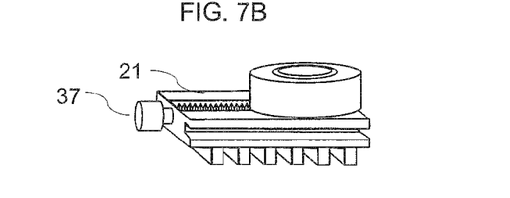
FIG. 7B shows a micromovement stand for the attachment socket.
Figure 8:
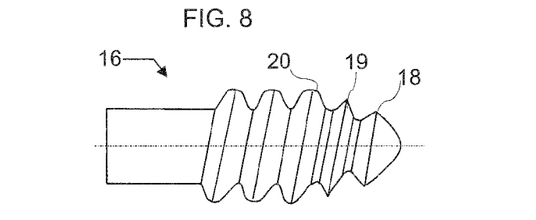
FIG. 8 shows a blade shape of the screw machining head.
Figure 9:
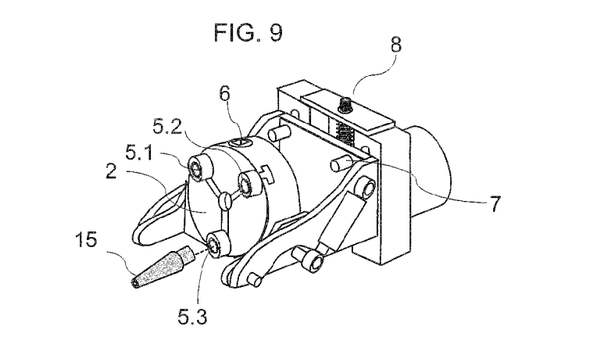
FIG. 9 is a perspective view of the flare machining attached to the mechanical portion of the piping system.
Figure 10:
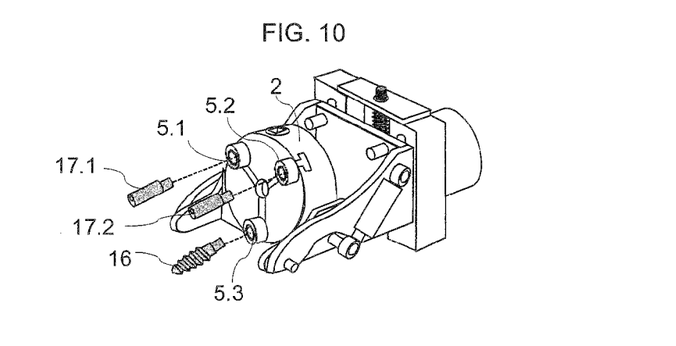
FIG. 10 is a perspective view of the screw machining head attached to the mechanical portion of the piping system.

FIG. 3 is a perspective view of a mechanical portion of the piping system 100. FIG. 4 is a plan view of the mechanical portion of the piping system 100. FIG. 5 is a side view of the mechanical portion of the piping system 100. FIG. 6 shows attachable machining heads, including a flare machining head 15, a screw machining head 16, and a head 17, and a prototypical guide roller 17.

In FIG. 5, reference numeral 9 designates an arm base operation shaft, 10 designates hydraulic cylinder A, 11 designates a chuck mount movable shaft, 12 designates a chuck mount support shaft, and 14 designates an arm base operating shaft bearing.

Figure 11A:
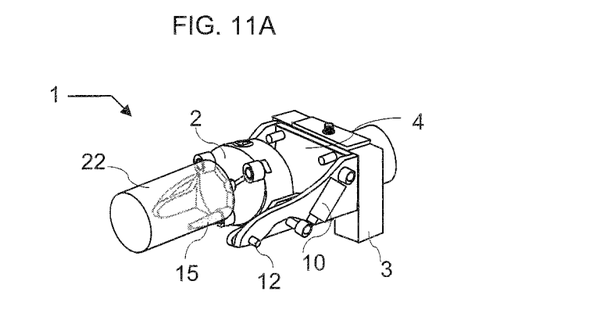
FIGS. 11A and 11B illustrate operation of the flare machining mechanism.
Figure 11B:
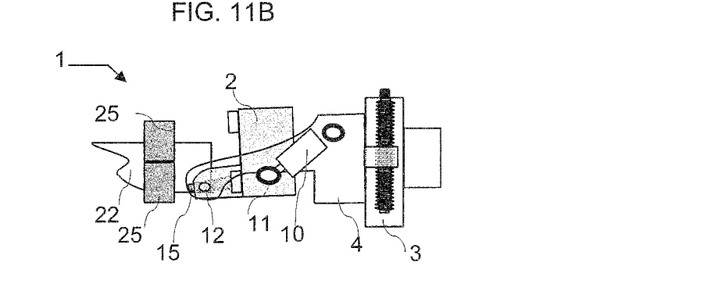
Figure 12A:
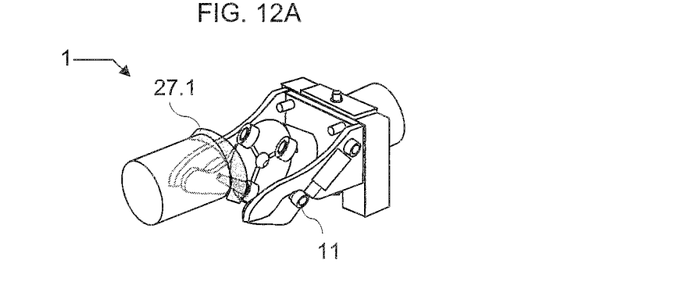
FIGS. 12A and 12B illustrate operation of the flare machining mechanism.
Figure 12B:
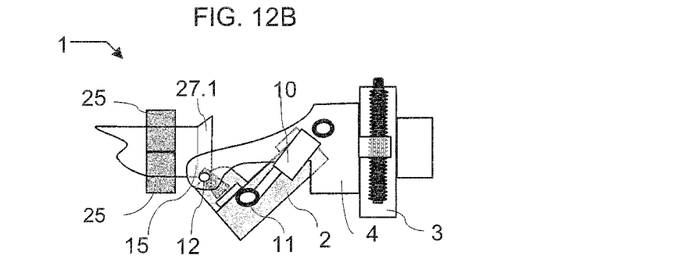
Figure 13A:
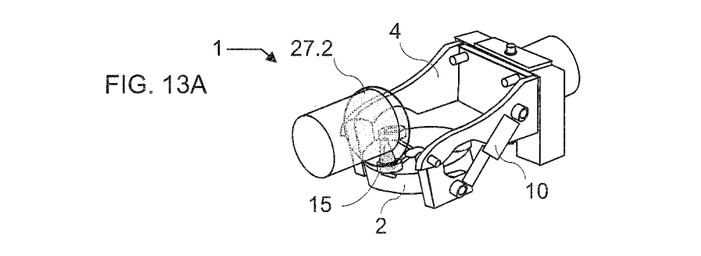
FIGS. 13A and 13B illustrate operation of the flare machining mechanism.
Figure 13B:
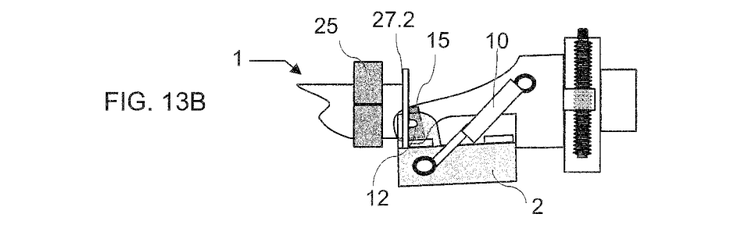

In the flare machining mechanism of the rotor mechanism 1, the pipe 22 is fixed in place by the clamp chuck 25 of the piping system 100 as shown in FIGS. 11A and 11B, with the end of the pipe 22 contacting the outside of the machining head 15. As shown in FIGS. 12A and 12B, a hydraulic cylinder A 10 extends along the center of the chuck mount support shaft, such that the flare machining head 15 moves from a horizontal position to a vertical position by sliding along a smooth surface while maintaining continuous contact with that surface like a metal lathe to flare the end of the pipe 22, and continues to slide until the state shown in FIGS. 13A and 13B is reached.

Figure 20:
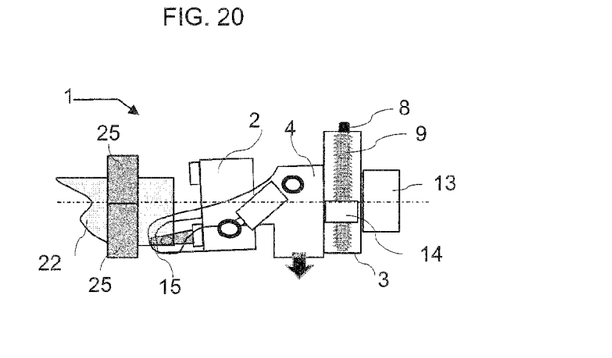
FIG. 20 is a diagram illustrating large-diameter flare machining of a pipe.
Figure 21:
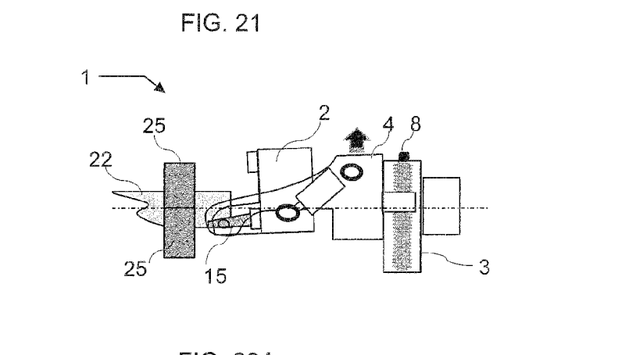
FIG. 21 is a diagram illustrating small-diameter flare machining of a pipe.

In the flare machining mechanism of the rotor mechanism 1, the method of matching the machine to the size of the pipe 22 to be processed is as follows. In the case of a wide pipe 22 like that shown in FIG. 20, the chuck mount 2 and the arm base 4 are moved in the direction indicated by the arrow by turning the arm base control knob 8 of the base mount 3. By contrast, in the case of a narrow pipe 22, these parts are moved in the direction shown in FIG. 21.

Figure 13C:
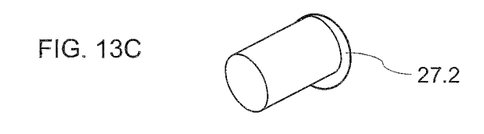
FIG. 13C shows a finished flared pipe.

Flaring is formed as shown in the finished flared product shown in FIG. 13C.

By moving the screw machining head 16 on the chuck mount 2 to match the size of the pipe 22 and advancing the rotor mechanism 1, the screw machining mechanism of the rotor mechanism 1 can execute convex screw machining that causes cold-pressed deformation of the outer circumference of the pipe 22 and concave screw machining that causes cold-pressed deformation of the inner circumference of the pipe 22.

Figure 14:
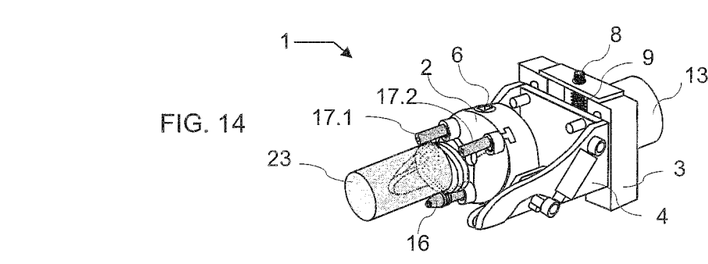
FIG. 14 is a perspective view of a process of forming convex screw threads around the outside of a pipe.

The screw machining mechanism of the rotor mechanism 1 is configured so that, in convex screw machining, as shown in FIG. 14 the screw machining head 16 and guide rollers 17.1 and 17.2 are positioned at predetermined locations around the outside of a pipe 23 by operation of the chuck control unit 6 to fit the size of the pipe 23, after which the rotor mechanism 1 is then rotated by a drive apparatus 27 and advanced at a constant speed by a drive shaft drive motor 32 to machine the end of the pipe 23 into a convex screw. The drive apparatus 27 is then rotated in reverse while the rotor mechanism 1 is withdrawn by the drive shaft motor 32.

Figure 22A:
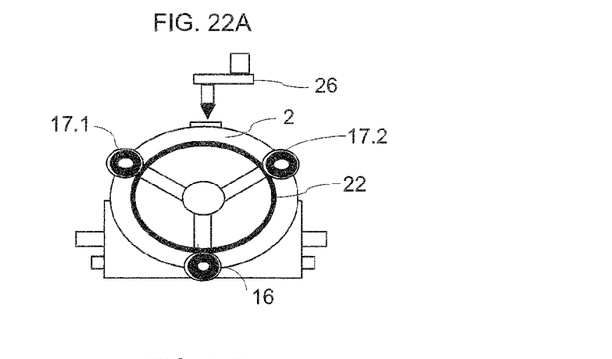
FIG. 22A is a front view of a convex screw machining mechanism.
Figure 22B:
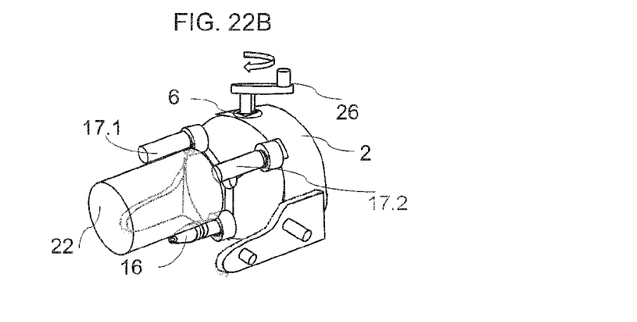
FIG. 22B is a perspective view of a convex screw machining mechanism.

As shown in FIG. 22A and FIG. 22B, the machining process when machining the end of the pipe 22 into a convex screw matching the size of the pipe 22 involves inserting a chuck handle 26 into the chuck control unit 6 of the chuck mount 2 and positioning the screw machining head 16 and the guide rollers 17.1, 17.2 around the outside of the pipe 22.

Figure 23A:
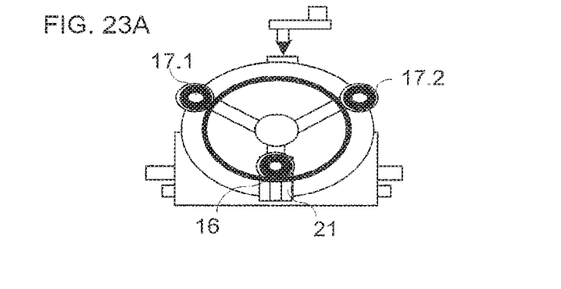
FIG. 23A is a front view of a concave screw machining mechanism.
Figure 23B:
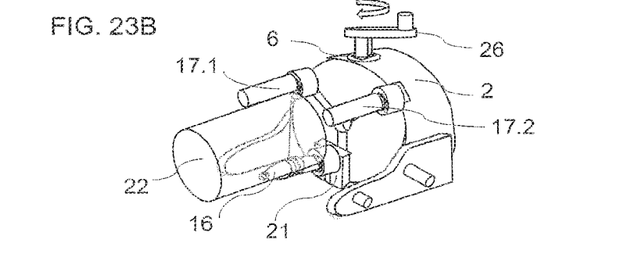
FIG. 23B is a perspective view of a concave screw machining mechanism.
Figure 24:
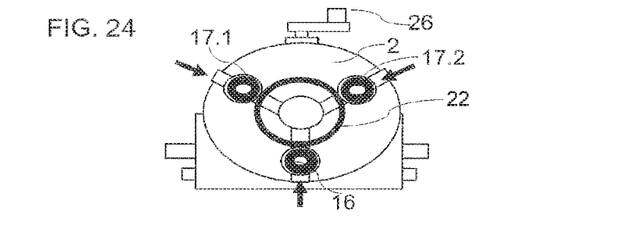
FIG. 24 is a front view of a small-diameter convex screw machining mechanism.

By contrast, as shown in FIG. 23A and FIG. 23B, the machining process when machining the end of the pipe 22 into a concave screw matching the size of the pipe 22 involves inserting a chuck handle 26 into the chuck control unit 6 of the chuck mount 2, positioning the screw machining head 16 and the guide rollers 17.1, 17.2 around the outside of the pipe 22, and subsequently positioning the screw machining head 16 inside the pipe 22 using an adjustment knob 37 of a machining head micromovement stand 21.

The machining head 16 and the guide rollers 17.1, 17.2 are moved along the chuck simultaneously by the chuck handle 26 inserted into the chuck control unit 6, while the position of the machining head 16 and adjustment to the thickness of the pipe 22 are carried out by operation of the machining head micromovement stand 21.

Figure 25A:
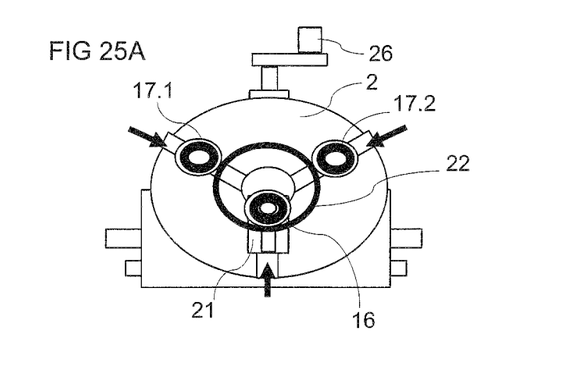
FIG. 25A is a front view of a small-diameter concave screw machining mechanism.
Figure 25B:
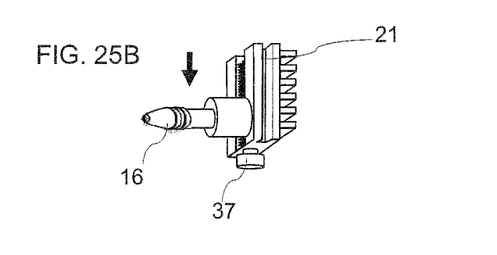
FIG. 25B is a perspective view of machining head micromovement.
Figure 25C:
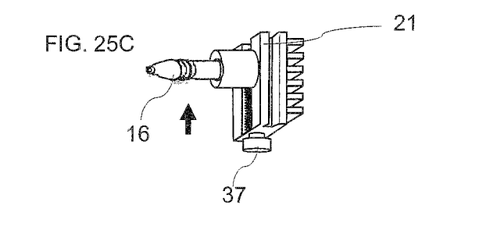
FIG. 25C is another perspective view of machining head micromovement.

As shown in FIGS. 25A and 25B, turning the adjustment knob 37 located on the machining head micromovement stand 21 moves the machining head 16 inserted in the attachment socket.

Figure 18:
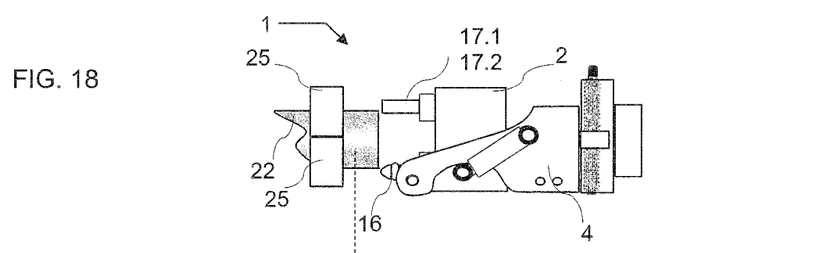
FIG. 18 is a diagram illustrating starting operation of convex screw machining and concave screw machining of a pipe.
Figure 19:
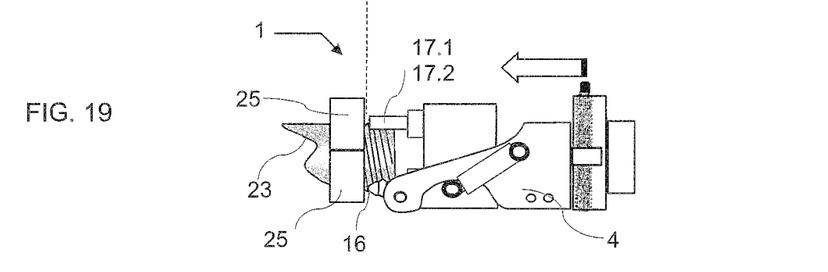
FIG. 19 is a diagram illustrating ending operation of convex screw machining and concave screw machining of a pipe.

Regarding the screw machining mechanism, the screw machining procedure involves moving while rotating the rotor mechanism 1 (that is, the machining head 16, the chuck mount with the guide rollers 17.1, 17.2 mounted thereon, the arm base 4, and the rotary base mount 3) positioned at the end of the pipe 22 fixed in place by the clamp chuck 25 as shown in FIG. 18 and screw machining the end of the pipe 23 with the machining head 16 and stopping at a predetermined position as shown in FIG. 19, after which the rotor mechanism 1 is rotated in reverse and the machining head is withdrawn while forming the screw machined part.

Figure 15:
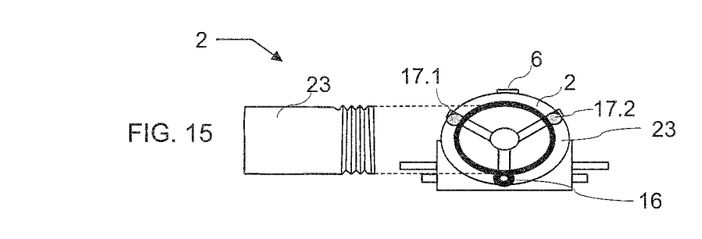
FIG. 15 is a schematic front view of the process of forming convex screw threads around the outside of a pipe.

A finished product showing convex screw machining on the outside of the pipe 23 is shown in FIG. 15.

Figure 16:
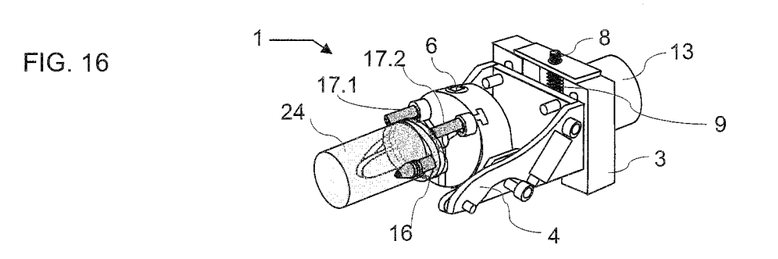
FIG. 16 is a perspective view of a process of forming concave screw threads on the inside of a pipe.

Regarding the screw machining mechanism of the rotor mechanism 1, in concave screw machining, as shown in FIG. 16 the screw machining head 16 is positioned inside the end of a pipe 24 and the guide rollers 17.1, 17.2 are positioned at predetermined locations around the outside of the pipe 24 according to the size of the pipe 24 by operation of the chuck control unit 6 and of the head micromovement stand 21. The rotor mechanism 1 is then rotated by the drive apparatus 27 and advanced at a constant speed by the drive shaft drive motor 32 to execute concave screw machining, after which the drive apparatus 27 is rotated in reverse while the rotor mechanism 1 is withdrawn by the drive shaft drive motor 32.

Figure 17:
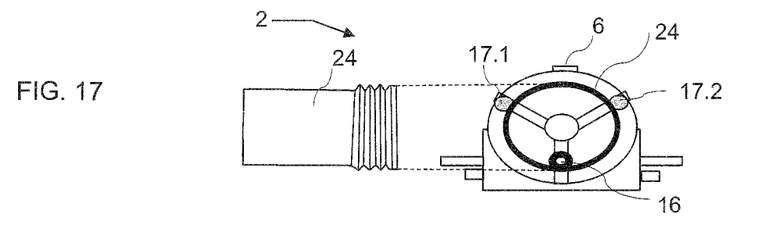
FIG. 17 is a schematic front view of the process of forming concave screw threads on the inside of a pipe.

A finished product with the concave screw machining completed on the inside of the pipe 24 is shown in FIG. 17.

In convex screw machining, the function of the guide rollers 17.1, 17.2 is to apply pressure to hold the end of the convex screw machined part of the pipe 23 in a shape that approaches a perfect circle.

By contrast, in concave screw machining, the function of the guide rollers 17.1, 17.2 is to apply pressure to prevent the end of the concave screw machined portion of the pipe 24 from widening and to hold the end of the pipe 24 in a shape that approaches a perfect circle.

The rod-shaped machining head 16 with the conical tip that is positioned either inside or outside the pipe 22 has teeth deployed in a spiral around the outer circumferential surface thereof, with the teeth disposed at the tip of the spiral forming an acute angle and thereafter gradually widening toward the base. The machining head 16 is configured so that, during screw machining, the machining head 16 at first bites into the end of the pipe 22 and can machine the end smoothly into shape while as the machining head 16 advances the screw threads tend to spread out so as to be able to maintain a uniform thickness especially in the case of thin-walled pipes.

The rounding of the screw threads is done in order to allow earth and sand to escape when foundation piles are sunk into the ground, in order to keep the joint sections clear for good coupling.

During formation of the screw threads, when the tip of the screw machining head is made to bite into the pipe, because the teeth are deployed in the shape of a spiral, a stress arises automatically that causes the machining head to advance and retreat along the pipe. As a result, the drive force required of the shaft drive motor 32 that advances and withdraws the rotor mechanism 1 can be reduced, thereby imposing less of a burden on the shaft drive motor 32.

Because the screw portions can be screwed together, long pipes can be shortened and those that have been screw machined can be carried to the construction site, screwed together, and buried in the ground.

Moreover, the piping system described using the embodiments disclosed above is compact and easily transportable to and from the construction site, and therefore can also be used in pipe-laying and building construction sites.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A piping system comprising:
a box frame comprising a base frame, an upper frame, a front frame, a back frame, and side frames;
a chuck disposed within the box frame;
a rotary base mount disposed within the box frame;
an arm base disposed within the box frame;
a rotor mechanism disposed within the box frame; and
a flare machining mechanism mountable on the rotor mechanism via the chuck and mounting a flare machining head that flares an end of a pipe outward, and a screw machining mechanism mountable on the rotor mechanism via the chuck and mounting a screw machining head configured to cause cold-pressed deformation of the end of the pipe to machine the outer circumference of the end of the pipe into a convex screw and to machine the inner circumference of the end of the pipe into a concave screw,
wherein only one of the flare machining mechanism and the screw machining mechanism is disposed on the rotor mechanism via the chuck at a time,
wherein the flare machining head of the flare machining mechanism and the screw machining head of the screw machining mechanism are interchangeably disposable on the same chuck,
wherein the piping system is configured to execute flare machining and screw machining of the end of the pipe by exchanging the flare machining head and the screw machining head.

2. The piping system according to claim 1, wherein the chuck on which either the flare machining head or the screw machining head is installed is provided on the arm base and installed on the rotary base mount,
wherein the chuck is caused to slide to fit a size of the pipe by a control part disposed on the rotary base mount.

3. The piping system according to claim 1, wherein the flare machining head comprises a conical machining head that moves from a horizontal position to a vertical position by sliding along a smooth surface of the end of the pipe while maintaining continuous contact with the surface of the pipe to flare the end of the pipe.

4. The piping system according to claim 1, wherein the screw machining mechanism that screw machines the end of the pipe further comprises multiple guide rollers disposed inside or outside the end of the pipe.

5. The piping system according to claim 4, wherein, in the screw machining mechanism that screw machines the end of the pipe by cold-pressed formation, the machining head that is disposed inside or outside the end of the pipe has a shape of a rod with a conical tip and has teeth deployed in a spiral around the outer circumferential surface of the cone-tipped machining head rod.

6. The piping system according to claim 5, wherein, of the teeth deployed in a spiral around the outer circumferential surface of the cone-tipped machining head rod, the teeth disposed at a tip of the cone form an acute angle that gradually widens as the spiral descends toward a base of the cone to form screw threads that spread out.

7. The piping system according to claim 4, further comprising:
a machining head micromovement stand; and
a plurality of attachment sockets disposed on the chuck and configured to accommodate the flare machining head, the screw machining head, and the guide rollers,
wherein, in screw machining, the screw machining head and the guide rollers are moved along the chuck simultaneously by operation of a chuck control unit, and a position of the screw machining head is adjusted to fit a size of the pipe by operation of the machining head micromovement stand.

8. The piping system according to claim 7, wherein the chuck is provided with one or more grooves, and
during screw machining, one of the attachment sockets is configured to move along at least one of the grooves in the chuck.

9. The piping system according to claim 1, wherein the rotor mechanism mounting the flare machining mechanism and the screw machining mechanism is configured to be moved by a mechanism attached to the box frame.

10. A piping system comprising:
a box frame comprising a base frame, an upper frame, a front frame, a back frame, and side frames;
a chuck disposed within the box frame;
a rotary base mount disposed within the box frame;
an arm base disposed within the box frame;
a rotor mechanism disposed within the box frame; and
a flare machining mechanism mountable on the rotor mechanism and configured to flare an end of a pipe outward, and a screw machining mechanism mountable on the rotor mechanism and configured to cause cold-pressed deformation of the end of the pipe to machine the outer circumference of the end of the pipe into a convex screw and to machine the inner circumference of the end of the pipe into a concave screw,
wherein only one of the flare machining mechanism and the screw machining mechanism is disposed on the rotor mechanism via the chuck at a time,
wherein a flare machining head of the flare machining mechanism and a screw machining head of the screw machining mechanism are interchangeably disposable on the same chuck,
wherein positions of the flare machining head and the screw machining head are changed by moving the chuck to execute flare machining and screw machining of the end of the pipe.

11. The piping system according to claim 10, wherein the chuck on which either the flare machining head or the screw machining head is installed is provided on the arm base and installed on the rotary base mount,
wherein the chuck is caused to slide to fit a size of the pipe by a control part disposed on the rotary base mount.

12. The piping system according to claim 10, wherein the flare machining head comprises a conical machining head that moves from a horizontal position to a vertical position by sliding along a smooth surface of the end of the pipe while maintaining continuous contact with the surface of the pipe to flare the end of the pipe.

13. The piping system according to claim 10, wherein the screw machining mechanism that screw machines the end of the pipe further comprises multiple guide rollers disposed inside or outside the end of the pipe.

14. The piping system according to claim 13, wherein, in the screw machining mechanism that screw machines the end of the pipe by cold-pressed formation, the machining head that is disposed inside or outside the end of the pipe has a shape of a rod with a conical tip and has teeth deployed in a spiral around the outer circumferential surface of the cone-tipped machining head rod.

15. The piping system according to claim 14, wherein, of the teeth deployed in a spiral around the outer circumferential surface of the cone-tipped machining head rod, the teeth disposed at a tip of the cone form an acute angle that gradually widens as the spiral descends toward a base of the cone to form screw threads that spread out.

16. The piping system according to claim 13, further comprising:
a machining head micromovement stand; and
a plurality of attachment sockets disposed on the chuck and configured to accommodate the flare machining head, the screw machining head, and the guide rollers,
wherein, in screw machining, the screw machining head and the guide rollers are moved along the chuck simultaneously by operation of a chuck control unit, and the position of the screw machining head is adjusted to fit a size of the pipe by operation of the machining head micromovement stand.

17. The piping system according to claim 16, wherein the chuck is provided with one or more grooves, and
during screw machining, one of the attachment sockets is configured to move along at least one of the grooves in the chuck.

18. The piping system according to claim 10, wherein the rotor mechanism mounting the flare machining mechanism and the screw machining mechanism is configured to be moved by a mechanism attached to the box frame.

* * * * *